Jan. 20, 1942.  E. E. GRIFFITHS  2,270,833
LIQUID ATTEMPERATING DEVICE
Filed Jan. 23, 1941  2 Sheets-Sheet 1
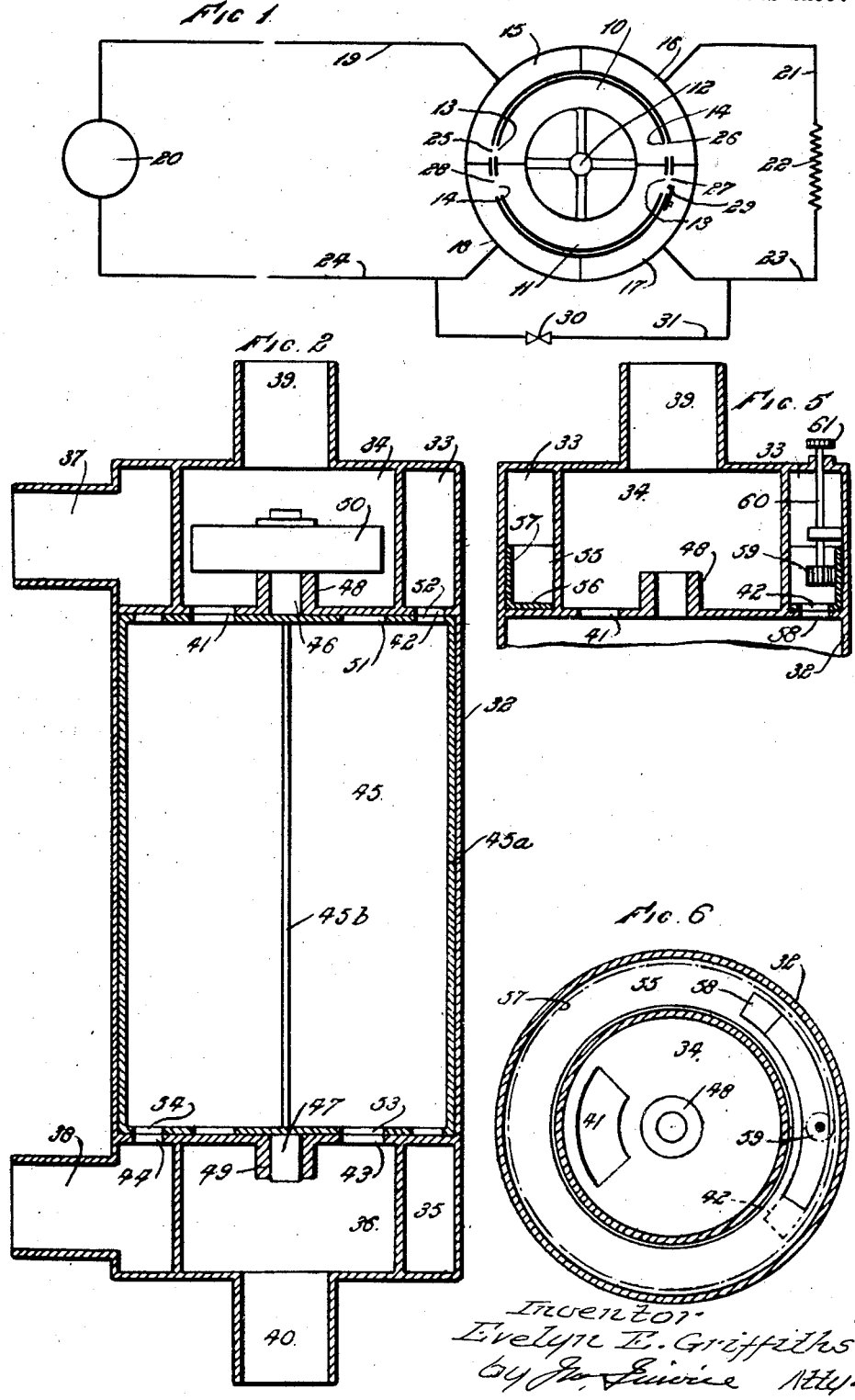
Inventor
Evelyn E. Griffiths
by Jno. Fiurie Atty.

Jan. 20, 1942.  E. E. GRIFFITHS  2,270,833
LIQUID ATTEMPERATING DEVICE
Filed Jan. 23, 1941  2 Sheets-Sheet 2
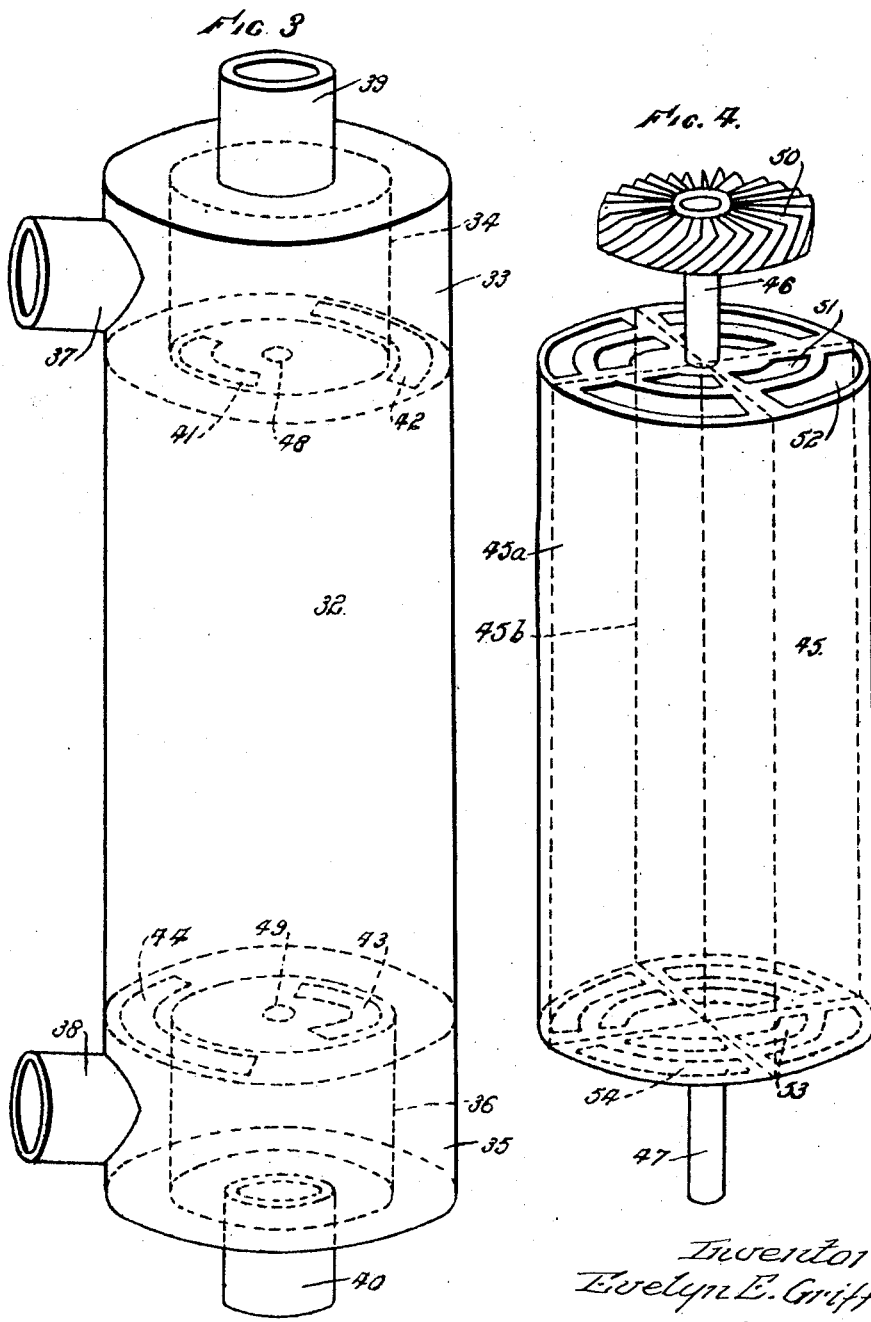

Patented Jan. 20, 1942

2,270,833

UNITED STATES PATENT OFFICE 2,270,833

LIQUID ATTEMPERATING DEVICE

Evelyn Edwin Griffiths, Bromborough, England

Application January 23, 1941, Serial No. 375,701
In Great Britain January 12, 1940

6 Claims. (Cl. 237—59)

This invention is for improvements in or relating to attemperating devices for hot liquid circulating systems hereinafter referred to as hot water circulating systems.

In hot water heating installations it often happens that certain of the heating units such as radiators require water at one temperature, whereas other heating units such as wall or ceiling panels require water at a lower temperature. For convenience, however, it is obviously only desirable to install a single hot water generator such as a calorifier and this is designed to provide hot water at the highest temperature required and therefore some means is necessary in the system, to enable the temperature of the water to be reduced where necessary. One arrangement for this purpose applied, for example, to the provision of hot water for a heating panel, comprises a pump which is adapted to pump a certain amount of return water from the heating panel to a thermostatically operated mixing valve which also has a connection to the main water feed pipe from the calorifier and supplies attemperated water to the heating panel. One disadvantage of this arrangement particularly when only a relatively small installation is involved is the cost of the additional pump and the thermostatically operated mixing valve. An alternative arrangement for providing attemperated water comprises an auxiliary calorifier, water from the main calorifier being passed through the coil of the auxiliary calorifier which in turn provides water at the reduced temperature for the heating panel or panels. It is necessary in this arrangement also to provide a thermostat control and circulating pump for the panel circuit, and this again in combination with the auxiliary calorifier is a costly arrangement. It has also been proposed in a hot water heating system wherein circulation is effected by high temperature water from the boiler, to attemperate water for the radiators by mixing high temperature water with return water.

One object of the present invention is therefore to provide a simple effective and inexpensive device which can easily be connected in, for example, the main hot water supply from a calorifier and which is adapted to provide hot water at a lower temperature than that flowing in the main calorifier circuit.

A further object of the invention is to construct the device so that within limits the degree of attemperation can be adjusted.

Accordingly the present invention provides in or for use in a hot water circulating system having a high temperature circuit and a low temperature circuit, an attemperating device comprising at least two chambers adapted alternately to be connected to each of said circuits so that each chamber receives in turn a quantity of high temperature water and a quantity of low temperature water and the mixture is circulated through the low temperature circuit and returned to the high temperature circuit by the pressure of the outflowing high temperature water.

According to a further feature of the invention there is provided an attemperating device for a hot water circulating system comprising at least two chambers and means for alternately connecting each chamber to a hot water feed pipe and an attemperated water feed pipe and an attemperated water return conduit and a main feed water return conduit. The purpose of the device is to attemperate hot water from the hot water feed pipe in such a manner that the attemperated water is circulated through the system to the main feed water return conduit by the pressure of the hot water in the hot water feed pipe.

As an example the hot water feed pipe may be assumed to be a pipe connected to the delivery side of a calorifier providing water at the highest temperature required in a hot water system whilst the attemperated water feed pipe may be a pipe for supplying attemperated water to a heating panel which requires water at a lower temperature than that of the supply from the calorifier. The attemperated water return conduit which supplies the attemperating water for mixing with the high temperature water from the calorifier may be assumed to be the return pipe from the heating panel whilst the main feed water return conduit may be the pipe connected to the return side of the calorifier.

Conveniently the device also includes means for adjusting the attemperated water flowing by way of the return pipe into each chamber. The preferred method of adjusting the degree of attemperation is however to provide means for adjusting the period during which each chamber is connected to the attemperated water return pipe and/or the main feed water return conduit and a spring loaded valve or the like is connected or is adapted to be connected between the attemperated water return pipe and the main water return pipe. The purpose of this spring loaded valve is to by-pass the attemperated water from the return pipe direct to the main feed water return pipe when the connection between a chamber of the device and the attemperated water return pipe is closed. Conveniently the alternate connection of the chamber to the hot water feed pipe and the attemperated water return pipe and the attemperated water return pipe and the main water return pipe is effected by a rotary valve mechanism, and the device may include a water wheel or the like (preferably positive) driving means for operating said valve mechanism, the water wheel being located in the path of flow of the water so as to be operated thereby.

The invention will be further described by way of example with reference to the accompanying drawings, whereon:

Figure 1 is a diagram illustrating the fundamental principle underlying the invention, Figure 2 is a semi-diagrammatic constructional embodiment of one form of the invention, Figure 3 is a detail perspective view of the outer casing of the device shown in Figure 2, Figure 4 is a perspective view of the inner member or rotor of the device shown in Figure 2, and Figures 5 and 6 are detail views of an adjusting device for varying the period during which attemperating water is permitted to pass into the device.

The arrangement shown in Figure 1 is not intended to show a practical embodiment of the invention and is intended primarily to enable the underlying principle of the invention to be understood. The arrangement comprises two chambers 10 and 11 mounted for rotation on a spindle 12 which may be driven for example through a water wheel operated by the flow of water. Each chamber has a port 13 and a port 14. Four headers 15, 16, 17 and 18 are arranged around the chambers 10 and 11. The header 15 is connected by a hot water feed pipe 19 to the supply side of a calorifier 20; the header 16 is connected by an attemperated water feed pipe 21, to for example, the heating coil 22 of a heating panel which requires water at a lower temperature than that supplied by the calorifier which also supplies water at the higher temperature to, for example, radiators; the header 17 is connected by an attemperated water return pipe 23 to the return side of the heating coil 22; finally the header 18 is connected by a main feed water return pipe 24 to the return side of the calorifier 20. The headers 15, 16, 17 and 18 are provided with ports 25, 26, 27 and 28 and preferably a slidable shutter 29 is provided for adjusting the length of the port 27 and a spring loaded valve 30 is connected in a bypass pipe 31 extending between the pipes 23 and 24.

The device above described operates as follows:

As the chambers 10 and 11 are rotated one chamber (the chamber 10 in the position shown) will, when the ports 13 and 25 come into alignment, receive a charge of high temperature water, whilst the chamber 11 will receive a charge of attemperating water from the return pipe 23 by way of its port 13 which is in register with the port 27. The high temperature water flowing into the chamber 10 will force out a corresponding amount of the water already contained therein which comprises a mixture of previously received charges of high temperature water from the pipe 19 and attemperating water from the pipe 23 and this mixture which is at the required temperature is fed by way of the pipe 21 through the coil 22. The return water from the pipe 23 flows into the chamber 11 and will of course discharge an equal amount of water through the port 28 to the pipe 24 so as to maintain the circulation through the calorifier. To enable the temperature of the mixture flowing to the coil 22 to be adjusted the shutter 29 may be set so as to vary the period during which this port is in register with the port 13 as the chambers rotate and to maintain the flow after the port 27 has been closed, the water can return to the calorifier by way of the by-pass pipe 31, the pressure of the water when the port 27 is closed being sufficient to overcome the load on the valve 30. The ports 13, 25 and 27 are, of course, in a different plane to the ports 14, 26 and 28.

It will be appreciated in the above example that in practice the arrangement will be made as far as possible so as to eliminate pulsations in the flow pipe by making the device so that the reversal of connections takes place with a minimum period of closing of the ports 25, 26, 27 and 28 and/or by providing more than two chambers.

The embodiment of the invention shown in Figures 2, 3 and 4, comprises an outer casing 32 having headers 33 and 34 at one end and headers 35 and 36 at the opposite end, the headers 34 and 36 being located within the headers 33 and 35. The header 33 has a branch 37 for connection to the attemperated water return pipe 23 whilst the header 35 has a branch 38 for connection to the attemperated water feed pipe 21. The header 34 has a branch 39 for connection to the main hot water flow pipe 19 from the calorifier, whilst the header 36 has a branch 40 for connection to the main return pipe 24. A port 41 is provided in the bottom of the header 34 whilst a port 42 is provided in the bottom of the header 33. Similar ports 43 and 44 are provided in the bottom of the headers 36 and 35. A combined rotary valve device and mixing chamber 45 is rotatably supported within the casing 32 between the headers at opposite ends thereof. The rotor 45 comprises supporting spindles 46 and 47 which are journalled in bearings 48 and 49 and the spindle 47 is provided with a water wheel device 50 which is located in the header 34 and is operated by the flow of water therethrough so as to rotate the valve mechanism. The valve mechanism and mixing chamber proper comprises a cylindrical chamber 45a divided by partition plates 45b into four compartments. Each compartment is provided at its upper part with two ports 51 and 52 and at its lower part with two ports 53 and 54.

The manner in which the device just described operates is similar to that described with reference to Figure 1 except that in this arrangement there are four chambers instead of two and therefore there are four discharges to the heating panel 22 for each revolution of the chamber 51. This tends to reduce pulsations having regard to the speed at which the chamber may rotate and in view of the fact that the ports 51, 52, 53 and 54 extend practically for the whole arc of the respective chambers it is not anticipated that there will be any substantial fluctuations in the flow.

Figure 5 shows an arrangement for adjusting the amount of attemperating water which is permitted to flow into each chamber as its port 52 registers with the port 42 in the header 33. This device comprises a ring 55 having a horizontal flange 56 which surrounds the header 34 and a vertical flange 57 provided with teeth on its internal face. The flange 56 has an arcuate slot 58 and by moving the ring angularly so as to vary the amount of overlap of the slot 58 with the port 42, the size of the latter can be adjusted and thereby the period during which the ports 52 are open to the header 33 can be varied. In the example shown the ring is adapted to be rotated through a pinion 59 which meshes with the teeth on the flange 57 and is provided with an operating spindle 60 and an external finger piece 61. In combination with this adjusting device a spring loaded or like valve will of course be provided similar to the spring loaded valve 30.

Instead of a slide valve arrangement for controlling the flow of water, poppet valves operated for example by means of a cam shaft may be used, such valves having the advantage that they can be fully opened and closed very rapidly so as to give a more or less uniform flow instead of a gradually increasing or decreasing flow. The various slide valves may be arranged however so that as one gradually closes another one gradually opens and the total port opening for the flow of liquid remains substantially uniform.

The valve mechanism of the device may be driven by a positive motor mechanism of, for example, similar construction to a water meter or the like, having a movable member which is driven positively by the flow of water in a part of the system and means such as an escapement mechanism or retarding device may be provided for pre-setting the speed of the motor. As the speed of the motor is a function of the rate of flow the speed of the motor can in turn be adjusted so as to regulate the rate of flow. The water motor may be located in a main flow pipe of the system so as to give control of the flow therethrough, or in, for example, the attemperated water return pipe so as to control the degree of attemperation. Instead of a water motor an electric motor or other positive independent driving unit may be used for operating the device.

I claim:

1. For a hot water circulating system having a hot water feed pipe, an attemperated water feed pipe, an attemperated water return pipe and a hot feed water return pipe, an attemperating means comprising at least two chambers and means for alternately connecting each chamber to the hot water feed pipe and the attemperated water feed pipe and the attemperated water return pipe, and the main feed water return pipe, means for adjusting the period during which each chamber is connected to the attemperated water return pipe and a loaded valve means connected between the attemperated water return pipe and the main feed water return pipe to by-pass the hot water return flow when the attemperating means is cut off.

2. For a hot water circulating system having a hot water feed pipe, an attemperated water feed pipe, an attemperated water return pipe and a main feed water return pipe, an attemperating means comprising an outer casing, two headers at one end of the casing, means for connecting one of said headers to the hot water feed pipe and the other header to the attemperated water return pipe, two headers at the opposite end of the casing, means for connecting one of said headers to the attemperated water feed pipe and the other to the feed water return pipe, a port in each of said headers, a chamber means rotatably mounted in said outer casing, a partition dividing said chamber means into at least two compartments, a water wheel located in the header connected to the hot water feed pipe, means coupling the water wheel to said chamber means for rotating the chamber means, ports in the compartments of the chamber means operative as the chamber means is rotated to register alternately with the ports in the headers so as to connect the compartments alternately to the hot water feed pipe and the attemperated water feed pipe and the attemperated water return pipe and the main feed water return pipe.

3. For a hot water circulating system having a hot water feed pipe, an attemperating water feed pipe, an attemperated water return pipe and a feed water return pipe, an attemperating means comprising at least two chambers, rotary valve means for alternately connecting each chamber to the hot water feed pipe and the attemperated water feed pipe and the attemperated water return pipe and the main feed water return pipe, a water wheel means located in the path of flow of the hot water to the attemperating means and means coupling said water wheel device to the rotary valve means for operation thereby.

4. For a hot water circulating system having a hot water feed pipe, an attemperating water feed pipe, an attemperated water return pipe and a hot feed water return pipe, an attemperating means comprising at least two chambers, rotary valve means for alternately connecting each chamber to the hot water feed pipe and the attemperated water feed pipe and the attemperated water return pipe and the feed water return pipe, a water wheel means located in the path of flow of the hot water to the attemperating means and means coupling said water wheel means to the rotary valve means for operation thereby, and means for adjusting the amount of attemperated water flowing by way of the attemperated water return pipe into each chamber.

5. For a hot water circulating system having a hot water feed pipe, an attemperating water feed pipe, an attemperated water return pipe and a hot feed water return pipe, an attemperating means comprising at least two chambers, rotary valve means for alternately connecting each chamber to the hot water feed pipe and the attemperated water feed pipe and the attemperated water return pipe and the main feed water return pipe, a water wheel means located in the path of flow of the hot water to the attemperating means and means coupling said water wheel means to the rotary valve means for operation thereby, means for adjusting the period during which each chamber is connected to the attemperated water return pipe and a loaded valve means connected between the attemperated water return pipe and the hot feed water return pipe to by-pass the hot water return flow when the attemperating means is cut off.

6. A hot water circulating system including a hot water feed pipe, an attemperated-water feed pipe, an attemperated-water return pipe, and a hot feed-water return pipe, an attemperating means comprising at least two chambers, rotary valve means for alternately connecting each chamber to the hot water feed pipe and the attemperating-water feed pipe and the attemperated-water return pipe and the hot water return pipe, a water wheel located in the path of and driven by the flow of hot water, and means for coupling the water wheel to the rotary valve means for operating the latter.

EVELYN EDWIN GRIFFITHS.